US009082541B2

(12) United States Patent
Lo et al.

(10) Patent No.: US 9,082,541 B2
(45) Date of Patent: Jul. 14, 2015

(54) COIL ELECTRICAL COMPONENT AND METHOD OF MANUFACTURING THE SAME

(75) Inventors: Peng-Chen Lo, New Taipei (TW); Lung Ching Tan, New Taipei (TW)

(73) Assignee: Magic Technology Co., Ltd., New Taipei (TW)

( * ) Notice: Subject to any disclaimer, the term of this patent is extended or adjusted under 35 U.S.C. 154(b) by 45 days.

(21) Appl. No.: 13/345,653

(22) Filed: Jan. 6, 2012

(65) Prior Publication Data

US 2012/0262265 A1 Oct. 18, 2012

(30) Foreign Application Priority Data

Apr. 13, 2011 (TW) ............................. 100112750 A

(51) Int. Cl.

| | |
|---|---|
| ***B29C 45/14*** | (2006.01) |
| ***H01F 27/02*** | (2006.01) |
| ***H01F 41/02*** | (2006.01) |
| *H01F 27/255* | (2006.01) |
| *H01F 17/04* | (2006.01) |

(52) U.S. Cl.

CPC ............ *H01F 27/022* (2013.01); *H01F 41/026* (2013.01); *H01F 27/255* (2013.01); *H01F 2017/048* (2013.01); *Y10T 29/4902* (2015.01)

(58) Field of Classification Search

USPC ............ 264/272.19, 611, 614, 618, 619, 621, 264/272.2, 272.21, 615–617, 104, 272.11, 264/272.12

See application file for complete search history.

(56) References Cited

U.S. PATENT DOCUMENTS

| | | | | |
|---|---|---|---|---|
| 3,451,934 | A * | 6/1969 | Hubbard | 252/62.54 |
| 6,392,525 | B1 * | 5/2002 | Kato et al. | 336/233 |
| 2001/0016977 | A1 * | 8/2001 | Moro et al. | 29/606 |
| 2002/0158739 | A1 * | 10/2002 | Shibata et al. | 336/90 |
| 2003/0139506 | A1 * | 7/2003 | Guilbert et al. | 524/323 |
| 2005/0015969 | A1 * | 1/2005 | Grundl et al. | 29/596 |
| 2010/0259353 | A1 * | 10/2010 | Saito et al. | 336/205 |

FOREIGN PATENT DOCUMENTS

| | | |
|---|---|---|
| JP | 2009-302420 | * 12/2009 |

* cited by examiner

*Primary Examiner* — Stella Yi

(57) ABSTRACT

A coil electrical component and a method of manufacturing the same. Magnetic material powder and adhesive powder are mixed in a predetermined proportion to form a solid mixture. The solid mixture and an object, such as a coil or a core material surrounded by the coil, are filled in a mold having a predetermined shape. The solid mixture in the mold is heated such that the magnetic material powder is adhered by the adhesive powder and covers the object, so as to form the coil electrical component. The coil electrical component corresponds in shape to the mold. Therefore, the coil electrical component has stable quality, and can be manufactured with less time and lower cost.

8 Claims, 5 Drawing Sheets

COIL ELECTRICAL COMPONENT AND METHOD OF MANUFACTURING THE SAME

BACKGROUND OF THE INVENTION

1. Field of the Invention

The present invention relates generally to an electrical component and a method of manufacturing the same, and, more particularly, to a coil electrical component and a method of manufacturing the same.

2. Description of Prior Art

A coil electrical component is usually designed to resist change of the current. For example, when the current flows through the inductor, a magnetic field is produced. Change of the magnetic field may induce change of the voltage and resist change of the current. The ability to inhibit the current change is called inductance.

In general, the early common inductor is ring inductor 1*a* having functions of self-shielding, high coupling and premature saturation, as shown in FIG. 1. In recent years, the demand for the inductor mounted on the circuit board is the trend of miniaturization, however, while the ring inductor 1*a* is larger in volume. Although the ring inductor used in the power supply equipment do not need to consider the volume issue, the manpower and time cost for winding the coil are also relatively increased. Compared to the "1" shaped inductor 1*b* or the "I" shaped inductor 1*c* as shown in FIG. 1, the volume of the two inductors are smaller than the ring inductor 1*a* and the coil 1*s* 2*b* and 12*c* can be formed by mechanical assistance. However, the magnetic field lines of the aforementioned three inductors are exposed to the air and which results to non-uniform in magnetic field lines and low saturation current.

The closed inductor has characteristics of low resistance, high inductance and high-current durability. Conventional technique provides an inductor 2*a* with a housing as shown in FIG. 2, including a housing 23*a* and core material 21*a* surrounding with coils (not shown) of the core material 21*a*, however, in the case of the tolerances for the size of the housing 23*a* and the core material 21*a* are too large, it is difficult to assemble into the inductor 2*a*. Therefore, conventional technique provides an integrated powder alloy inductor 2*b* as shown in FIG. 2. The magnetic powder, the coil 22*b* and magnetic powder are sequentially added in the mold and a high pressure (e.g., 200 kg/cm$^2$) is applied (for example, by stamping with a punch) in order to pressing the magnetic powder into core material 21*b* and the inductor 2*b* is formed. However, such technique cannot be used in any shape of mold. Since the finished product in the mold is likely to be broken during the high pressure molding step, equipment providing high pressure and specific shapes of mold withstand high pressure are necessary. In addition, the large scale inductor as an example, it is not easy to reduce the production cost, since an extremely large pressure is needed to provide the mechanism exerting pressure on the inductor for molding. Furthermore, conventional technique also provides an inductor 2*c* as shown in FIG. 2. Since the inductor 2*c* includes core material 21*c*, coil 22*c* and coating body 23*c*, in case of adopting the aforementioned high pressure pressing technique for molding the coating body 23*c*, the core material 21*c* is inevitably to be broken.

Therefore, currently manufacturing method of the inductor mostly uses a mold placing the core material 21*c* and the coil 22*c*, and then the gel with the magnetic powder is injected in the mold. After heating at high temperature, the coating body 23*c* is molded. However, while using the gel coating the core material and the coil may avoid the problem of broken core material by the aforementioned high pressure pressing, the bubbles may be produced when the gel is injected into the mold. It is difficult to achieve a vacuum state during the process, besides, owing to the specific gravity of the magnetic powder is greater than the gel, thus settlement phenomena may occur in the gel. These problems or phenomena may often affect the characteristics of the inductors.

SUMMARY OF THE INVENTION

In view of the mentioned disadvantages of the prior techniques, an object of the present invention is to provide a coil electrical component and a method of manufacturing the coil electrical component, in order to economize production cost and improve quality of the inductor.

To achieve this object and other objects, the present invention provides a method of manufacturing a coil electrical component, the method comprising: (1) mixing magnetic material powder and adhesive powder in a predetermined proportion to form a solid mixture; (2) disposing an object and the solid mixture in a mold having a predetermined shape, wherein the object is covered by the solid mixture, and the mold needs no high-pressure process; and (3) heating the solid mixture in the mold such that the magnetic material powder are adhered by the adhesive powder and covers the object, so as to form the coil electrical component corresponding in shape to the mold.

The solid mixture further comprises insulation material powder or adhesive gel.

The method further comprises, before the execution of step (3), shaking the mold such that the solid mixture is uniformly mixed.

The step (3) further comprises pressing the mold when heating the solid mixture such that the mold is uniformly filled with the solid mixture.

The present invention also provides a coil electrical component, comprising: a core material including: a cylindrical part; a first end formed on one end of the cylindrical part, and having a first cross section greater than a cross section of the cylindrical part; and a second end formed one the other end of the cylindrical part, and having a second cross section greater than the first cross section; a coil having a wire spirally surrounding the cylindrical part of the core material; and a coating body including magnetic material powder and adhesive powder mixed with the magnetic material powder, the coating body coating the core material surrounded by the coil, wherein the wire has two ends exposed from the coating body.

The coating body coats the first end of the core material and the cylindrical part surrounded by the wire and exposes the second end of the core material.

Compared to the conventional technique, the coil electrical component and the non-high pressure solid-state packaging method of manufacturing the same according to the invention may resolve problems of tolerance resulted from the inductor composed of the housing and the core material, cracking of the core material using powder pressing technique, and bubbles and phenomena of powder settlement resulted from using the gel coating the core material and the coil in. the conventional technique.

DETAILED DESCRIPTION OF PREFERRED EMBODIMENTS

The following illustrative embodiments are provided to illustrate the disclosure of the present invention, these and other advantages and effects can be apparently understood by those in the art after reading the disclosure of this specification. The present invention can also be performed or applied by other different embodiments. The details of the specification may be on the basis of different points and applications, and numerous modifications and variations can be devised without departing from the spirit of the present invention.

Furthermore, the invention of the instructions are simplified schematic diagram, the only way to indicate that the basic technical idea of the invention, so the actual implementation of each component type, quantity and proportion of visual implementation of the requirements change.

Figure 3A:
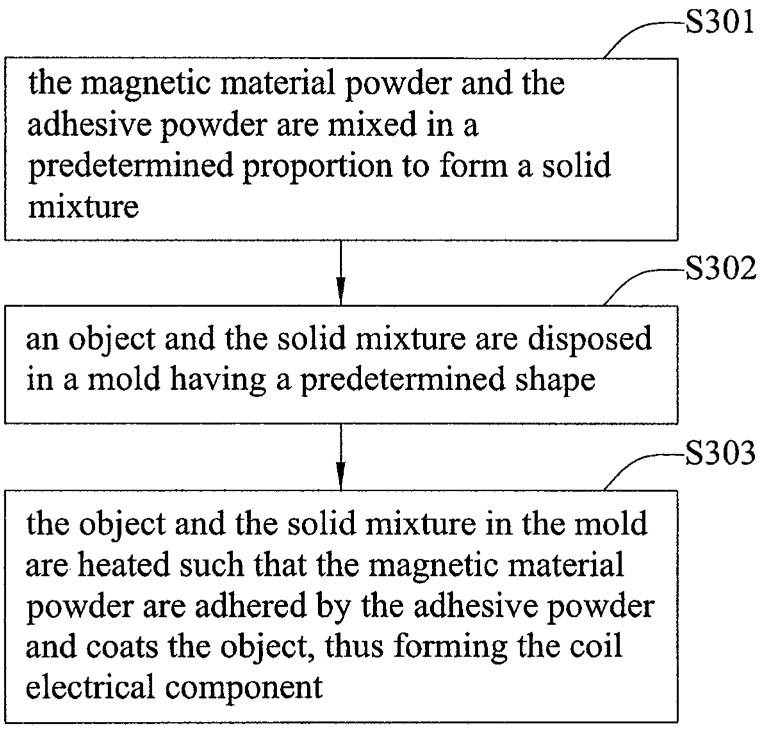
FIG. 3A and FIG. 3B show a schematic flow chart and a schematic diagram illustrating a non-high pressure solid-state packaging method of manufacturing a coil electrical component of the preferred embodiment according to the present invention.
Figure 3B:
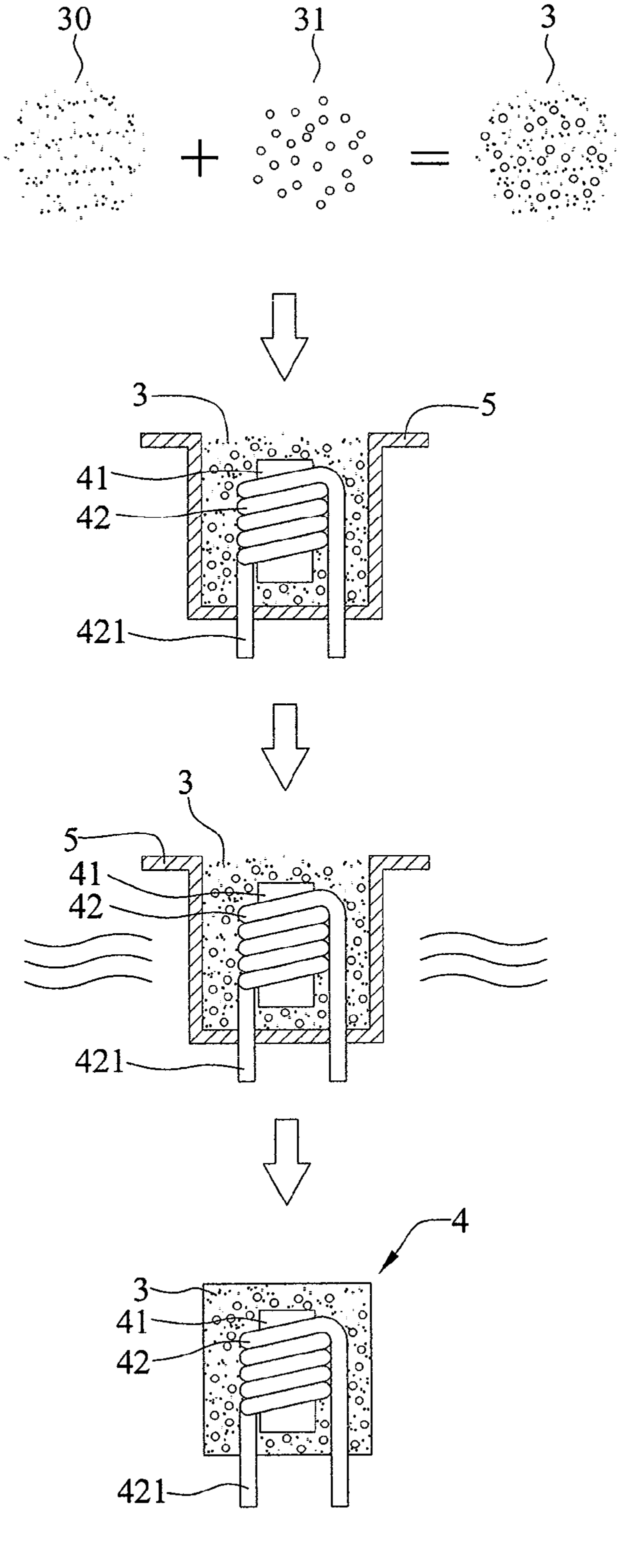

Referring to FIG. 3A and FIG. 3B, FIG. 3A shows a schematic flow chart of a non-high pressure solid-state packaging method of manufacturing a coil electrical component of the preferred embodiment according to the present invention, and FIG. 3B shows a schematic diagram of a non-high pressure solid-state packaging method of manufacturing a coil electrical component of the preferred embodiment according to the present invention.

In step S301, the magnetic material powder 30 and the adhesive powder 31 are mixed in a predetermined proportion to form a solid mixture 3. In an embodiment of the present invention, the predetermined proportion is 95% to 5%, 90% to 10%, 85% to 15%, 80% to 20%, 75% to 25%, or 70% to 30%, and so on. Preferably, the magnetic material powder 30 occupies more than 70% of the solid mixture 3. The fixation of the solid mixture 3 is higher as the proportion of the adhesive powder 31 is higher. In addition, the magnetic material powder 30 may be a soft magnetic material, and the adhesive powder 31 may be a solid resin. Then, goes to step S302.

In step S302, an object (which is surrounded with the core material 41 having the coil 42) and the solid mixture 3 are disposed in the mold 5, which has a predetermined shape. In FIG. 3B, the solid mixture 3, the object (which is surrounded with the core material 41 having the coil 42) and the solid mixture 3 are sequentially added in the mold 5 such that the solid mixture 3 may uniformly coat the object (which is surrounded with the core material 41 having the coil 42). In addition, the inductor is formed without applying a high pressure to the mold 5. In an embodiment of the present invention, a pressure such as 100 $kg/cm^2$ or less may be applied to the mold 5. In an embodiment of the present invention, the mold 5 is provided with a hole, and the coil 42 has one end 421 that stretches out from the hole. Then, goes to step S303.

In step S303, the object (which is surrounded with the core material 41 having the coil 42) and the solid mixture 3 in the mold 5 are heated such that the magnetic material powder 30 are adhered by the adhesive powder 31 and coats the object, thus forming the coil electrical component (such as the inductor 4 as shown in FIG. 3B) corresponding in shape to the mold 5. In addition, the mold 5 may be shaking slightly prior to heating, so as to evenly mix the magnetic material powder 30 and the adhesive powder 31 in the solid mixture 3. In addition, the mold 5 may be evenly filled with the solid mixture 3 by a slight pressure during heating. The slight pressure can be used in aiding the solid mixture 3 to be uniformly filled in the mold 5 rather than requirement for forming the inductor 4.

The solid mixture 3 may slightly shrink in volume after heating, and thus can be easily separated from the mold 5, for example, by turning the mold 5 to separate the solid mixture 3 coating with the core material 41 surrounded with the coil 42 from the mold 5, so as to form the inductor 4.

Figure 1:
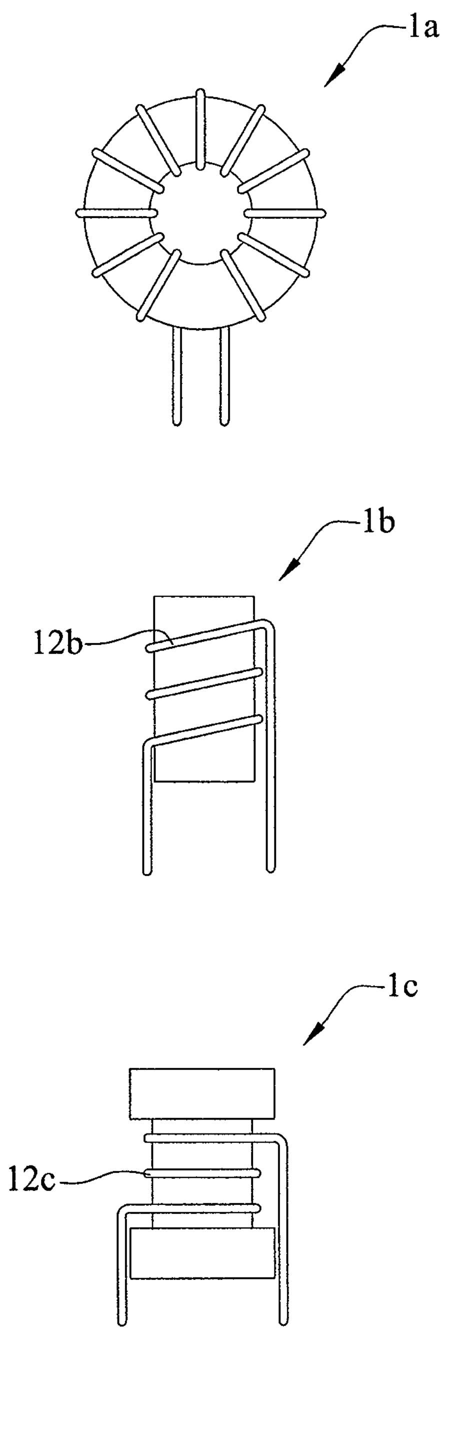
FIG. 1 (PRIOR ART)
FIG. 1 shows schematic diagrams of a ring inductor, an "1" shaped inductor and an "I" shaped inductor according to the prior art.
Figure 2:
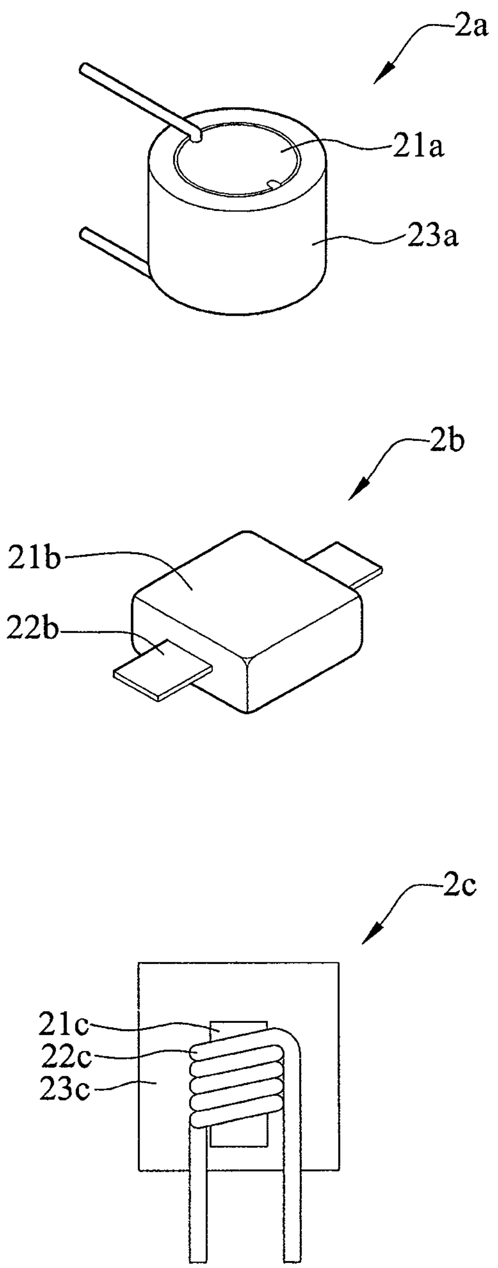
FIG. 2 (PRIOR ART)
FIG. 2 shows schematic diagrams of a variety of closed inductors according to the prior art.

In step S302, in the mold 5 may be placed an individual coil 42 or the core material 41 surrounded with the coil 42. In the case of the individual coil 42 placing in, the inductor 2*b* as shown in FIG. 1 is formed without an equipment in a relatively high cost. In the case that the core material 41 surrounded with the coil 42 is placed in, the inductor 2*c* as shown in FIG. 1 is formed without problem of uneven magnetic properties caused by the gel.

In step S301, the insulation material powder such as silicon dioxide (SiO2) may be added into the solid mixture 3, so as to increase the solidity of the solid mixture 3. An adhesive gel may also be added. The core material 41 may be selected from ferrite, iron magnetic material or soft magnetic material. The magnetic material powder 130 may be Fe, FeAlSi (MPP (FeNiMo)/hi-flux (FeNi50)), sendust: (FeSiAl), Ferrite, carbonyl iron and soft magnetic material. The core material 41 and the magnetic material powder 30 may be selected from different material, that is, the core material 41 and the solid mixture 3 may have different magnetic permeability.

Although the solidity of the solid mixture may be increased by increasing the proportion of the adhesive powder or doping with the insulation material powder, the magnetic permeability may be reduced since the proportion of the magnetic material powder is relatively reduced. The solution may be selecting the material types of the magnetic material powder and the core material to enhance the magnetic permeability. For example, when the magnetic permeability of the solid mixture 3 is reduced resulted from increasing the proportion of the adhesive powder for increasing the solidity, the material with higher magnetic permeability may be selected as the material of the core material. Also, the material with higher magnetic permeability may be easily cracked under high pressure, which is absolutely impossible to adopt conventional powder molding techniques, but using the gel doped with the magnetic powder may arise the problem of settlement phenomena of bubble or powder. Therefore, only if using the non-high pressure solid-state packaging method of coil electrical component according to the present invention may take into account the solidity and the magnetic permeability of the inductor.

The magnetic material powder may be bonded to the adhesive powder, and the solid mixture mixed with the magnetic material powder and the adhesive powder may coat the coil or the core material surrounding the coil by the adhesive powder.

Upon specific implementation, the magnetic material powder and the adhesive powder are evenly mixed in a proportion of 90% to 10%, 85% to 15%, 80% to 20%, 75% to 25%, or 70% to 30%, and filled in the mold for coating the object, and then the solid mixture is heated at a temperatures of about 100° C. for two hours to complete the solid-state packaging.

Figure 4:
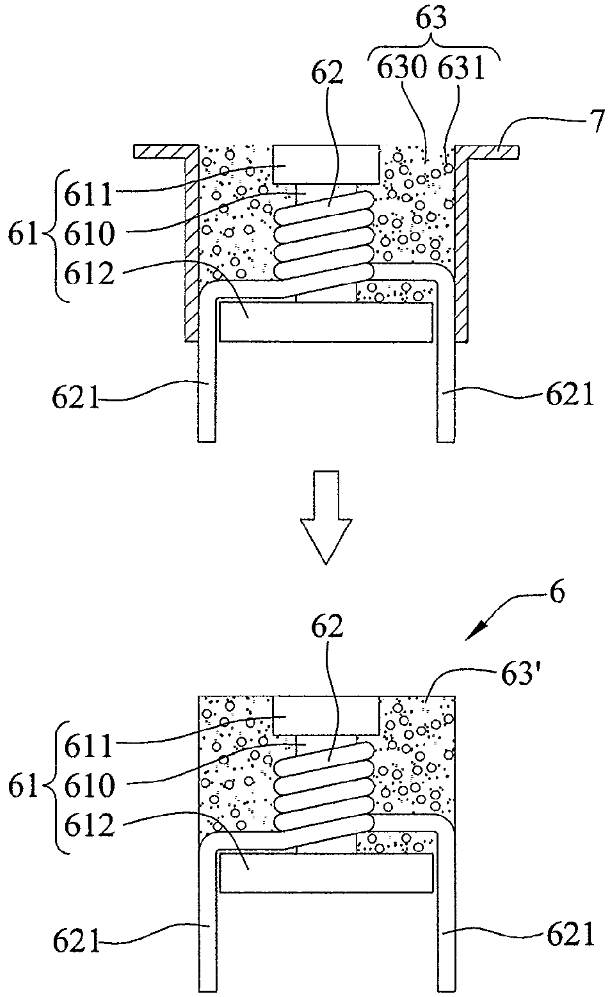
FIG. 4 shows schematic diagrams of an inductor manufactured by using the non-high pressure solid-state packaging method according to the present invention.

Furthermore, FIG. 4 shows schematic diagrams of an inductor manufactured by using the non-high pressure solid-state packaging method according to the present invention. The inductor 6 includes the core material 61, the coil 62 and the coating body 63'.

The core material 61 has a cylindrical part 610 and the first and second ends 611 and 612 formed on two ends of the cylindrical part 610, respectively. The cross sections of the first and second ends 611 and 612 perpendicular to the extension direction of the cylindrical part 610 are greater than the cross section of the cylindrical part 610, and the cross section of the first end 611 is smaller than the cross section of the second end 612. The coil 62 is formed by a wire spirally surrounding the cylindrical part 610 of the core material 61.

The coating body 63' includes the solid mixture 63 mixed by the magnetic material powder 630 and the adhesive powder 631 in a predetermined proportion, coats the core material 61 surrounding the coil 62, and exposes the end 621 of the wire as a wiring part. In addition, as shown in FIG. 4, the coating body 63' coats the first end 611 and the cylindrical part 610 surrounding the wire, and exposes the second end 612 of the core material 61.

During process, the magnetic material powder 630 and the adhesive powder 631 may be uniformly mixed into the solid mixture 63, the cylindrical part 610 surrounding the wire may be disposed in the mold 7, the gap between the cylindrical part 610 surrounding the wire and the mold 7 may be filled with the solid mixture 63, and finally heated, so as to form the coating body 63' by bonding the magnetic material powder 630 to the adhesive powder 631 and coating the first end 611 and the surrounding 610 surrounding the coil 62 of the core material 61, and expose the second end 612 of the core material 61 and the end 621 of the wire for making an inductor 6.

Figure 5:
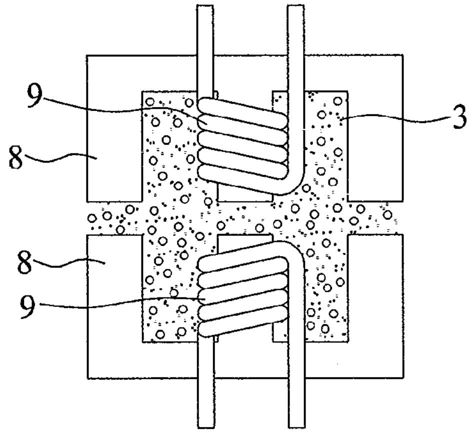
FIG. 5 shows schematic diagrams of a transformer manufactured by using the non-high pressure solid-state packaging method according to the present invention.

The non-high pressure solid-state packaging method of the coil electrical component of the invention can be applied in the inductor, but also can be used in the transformers, as shown in FIG. 5, the transformer includes two E-type core 8, the coil 9 for surrounding the column of the E-type core 8, and the gap between two cores 8 may be filled with the solid mixture 3 for packaging, thereby reducing the leakage flux, increasing the core section area and increasing the efficiency, and the noise may be reduced as well.

The solid mixture 3 may include the magnetic material powder and the adhesive powder, and also may include the insulation material power, or may be doped with adhesive gel.

In summary, the non-high pressure solid-state packaging method of the coil electrical component of the invention utilizes the solid mixture mixed by the magnetic material powder and the adhesive powder in a predetermined proportion for the package of the coil electrical component. During process, in that the adhesive powder will be melted under heat, thus after heating the mold filled with the solid mixture for coating object, such as the coil or the core material surrounding the coil, the solid mixture may be tightly adhered to the object for the coil electrical component closed magnetic loop. In addition, high pressure is not required in the process of utilizing the adhesive powder, just a light pressure is needed to aid the powder uniformly filling in the mold, thus problem of cracking of the core material may be avoided. Hence, selectivity of type of the core material can be increased, and also the cost of the equipment can be reduced. Furthermore, the adhesive and the magnetic material are same phase (solid state), which can be easily mixed and the magnetic material powder and the adhesive powder can be bonded to each other during the mixing process, the volume of the solid mixture can be reduced for coating the core material after heating. Therefore, using gel injected into the mold may not occur the bubbles and phenomena of powder settlement.

Hence, the coil electrical component manufactured using the non-high pressure solid-state packaging method of coil electrical component of the invention may reduce production costs compared to the conventional technique, and the coating body thereof is uniform in magnetic properties, and thus quality of the manufactured coil electrical component is stable, and good in inductive or electromagnetic properties.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method of manufacturing a coil electrical component, the method comprising:

(1) mixing magnetic material powder and adhesive powder in a predetermined proportion to form a solid mixture;

(2) disposing an object and the solid mixture in a mold having a predetermined shape, wherein the object is covered by the solid mixture, and a pressure below 50 $kg/cm^2$ is applied to the mold; and (3) heating the solid mixture in the mold such that the magnetic material powder is adhered by the adhesive powder and covers the object, so as to form the coil electrical component corresponding in shape to the mold.

2. The method of claim 1, further comprising mixing the solid mixture with insulation material powder.

3. The method of claim 1, further comprising, before the execution of step (3), shaking the mold.

4. The method of claim 1, wherein step (3) further comprises pressing the mold when heating the solid mixture such that the mold is uniformly filled with the solid mixture.

5. The method of claim 1, wherein the object is a coil or a core material surrounded by the coil.

6. The method of claim 5, wherein the mold is provided with a hole, and the coil has one end stretched out from the hole.

7. The method of claim 1, wherein the predetermined proportion is 70:30 to 95:5 by weight.

8. The method of claim 1, further comprising mixing the solid mixture with adhesive gel.

* * * * *